US012807804B2

(12) United States Patent
Qi et al.

(10) Patent No.: US 12,807,804 B2
(45) Date of Patent: Nov. 24, 2026

(54) PHOTOCURABLE ADHESIVE COMPOSITION

(71) Applicant: Henkel AG & Co. KGaA, Duesseldorf (DE)

(72) Inventors: Yalong Qi, Shanghai (CN); Bin Li, Shanghai (CN); Hongyu Chu, Shanghai (CN)

(73) Assignee: Henkel AG & Co. KGaA, Duesseldorf (DE)

(*) Notice: Subject to any disclaimer, the term of this patent is extended or adjusted under 35 U.S.C. 154(b) by 644 days.

(21) Appl. No.: 18/237,546

(22) Filed: Aug. 24, 2023

(65) Prior Publication Data

US 2023/0392003 A1 Dec. 7, 2023

Related U.S. Application Data

(63) Continuation of application No. PCT/CN2021/077601, filed on Feb. 24, 2021.

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08L 9/00*** | (2006.01) |
| ***C08L 63/00*** | (2006.01) |

(52) U.S. Cl.

CPC ................. *C08L 63/00* (2013.01); *C08L 9/00* (2013.01); *C08L 2205/025* (2013.01); *C08L 2205/035* (2013.01); *C08L 2207/53* (2013.01)

(58) Field of Classification Search

CPC .. C08L 63/00; C08L 63/08; C08L 9/00; C08L 51/04; C08L 71/02; C08L 2205/025; C08L 2205/035; C08L 2207/53; C09J 163/08; C08G 59/34; C08G 59/4064

USPC ........... 522/54, 49, 6, 189, 184, 71, 1; 520/1

See application file for complete search history.

(56) References Cited

U.S. PATENT DOCUMENTS

| | | | | |
|---|---|---|---|---|
| 9,783,713 | B2 | 10/2017 | Zhang et al. | |
| 10,131,823 | B2 | 11/2018 | Sakata et al. | |
| 11,390,742 | B2 | 7/2022 | Chen et al. | |
| 11,591,493 | B2 | 2/2023 | McGrail et al. | |
| 2018/0244964 | A1* | 8/2018 | Yang ...................... | C09J 163/00 |

FOREIGN PATENT DOCUMENTS

| | | | |
|---|---|---|---|
| CN | 1148398 | A | 4/1997 |
| CN | 101553545 | A | 10/2009 |
| CN | 103756615 | A | 4/2014 |
| CN | 106459703 | A | 2/2017 |
| CN | 111511833 | A | 8/2020 |
| JP | S63191880 | A | 8/1988 |
| JP | 2008169240 | A | 7/2008 |
| JP | 2019078785 | A | 5/2019 |
| TW | I572692 | B | 3/2017 |
| TW | I692502 | B | 5/2020 |
| WO | 9528431 | A1 | 10/1995 |
| WO | 2019183753 | A1 | 10/2019 |

OTHER PUBLICATIONS

PCT International Search Report—WO PCT/CN2021/077601—Completed: Nov. 2, 2021 Mailing date: Nov. 17, 2021—Number of pp. 5.

* cited by examiner

*Primary Examiner* — Jessica Whiteley

(74) *Attorney, Agent, or Firm* — Steven C. Bauman

(57) ABSTRACT

This invention relates to a photocurable adhesive composition comprising at least one first hydroxyl terminated epoxidized unsaturated polyolefin having an epoxide equivalent weight less than 250 g/eq; at least one second hydroxyl terminated epoxidized unsaturated polyolefin having an epoxide equivalent weight greater than or equal to 250 g/eq; at least one dimer acid modified epoxy resin;
at least one core-shell toughening agent; at least one polyol component; and at least one cationic photoinitiator. The cured product of the photocurable adhesive composition of the present invention shows excellent acid resistance and elongation property and is therefore suitable to be used for the protection of glass edge during the glass slimming process.

15 Claims, No Drawings

PHOTOCURABLE ADHESIVE COMPOSITION

TECHNICAL FIELD

This invention relates to a photocurable adhesive composition comprising at least one first hydroxyl terminated epoxidized unsaturated polyolefin having an epoxide equivalent weight less than 250 g/eq; at least one second hydroxyl terminated epoxidized unsaturated polyolefin having an epoxide equivalent weight greater than or equal to 250 g/eq; at least one dimer acid modified epoxy resin; at least one core-shell toughening agent; at least one polyol component; and at least one cationic photoinitiator. The cured product of the photocurable adhesive composition of the present invention shows excellent acid resistance and elongation property and is therefore suitable to be used for the protection of glass edge during the glass slimming process.

BACKGROUND OF THE INVENTION

With the popularization of electronic device, the electronic device is desired to be made thinner and lighter. One way to achieve the goal is through slimming of flat panel display (FPD) used on the devices. TFT-LCD as a major type of FPD typically forms a box enclosing liquid crystal between the two glasses. The edge of the TFT-LCD is sealed with UV curable adhesives to prevent the etching solution from entering the box. Because etching solution often contains strong acid, glass protected with traditional UV curable adhesives can only be thinned to about 0.3 mm.

In addition, curved or round cornered glass becomes more and more popular and is the trend for the future display of electronic device. The traditional UV curable adhesive will not have enough elasticity to be applied for the protection of curved or round cornered glass.

Therefore, there is a need for developing a new photocurable adhesive which has improved acid resistance and elasticity to better seal and protect the glass during the glass slimming process.

SUMMARY OF THE INVENTION

The present invention relates to a photocurable adhesive composition, comprising:

a) at least one first hydroxyl terminated epoxidized unsaturated polyolefin having an epoxide equivalent weight less than 250 g/eq;
b) at least one second hydroxyl terminated epoxidized unsaturated polyolefin having an epoxide equivalent weight greater than or equal to 250 g/eq;
c) at least one dimer acid modified epoxy resin;
d) at least one core-shell toughening agent;
e) at least one polyol component; and
f) at least one cationic photoinitiator; wherein the weight ratio between the first hydroxyl terminated epoxidized unsaturated polyolefin and the second hydroxyl terminated epoxidized unsaturated polyolefin is from 2:5 to 6:5;

the amount of the core-shell toughening agent is from 3 to 15% by weight based on the total weight of the adhesive composition; and the amount of the polyol component is from 1 to 9% by weight based on the total weight of the adhesive composition.

The present invention also relates to a production method of the photocurable adhesive composition.

The present invention also relates to a cured product of the photocurable adhesive composition. The cured product of the photocurable adhesive composition has excellent acid resistance and elongation property.

The present invention also relates to an article bonded by or sealed with the cured product of the photocurable adhesive composition.

DETAILED DESCRIPTION OF THE INVENTION

In the following passages the present invention is described in more detail. Each aspect so described may be combined with any other aspect or aspects unless clearly indicated to the contrary. In particularly, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skilled in the art to which this invention belongs to. By means of further guidance, term definitions are included to better appreciate the teaching of the present invention.

Hydroxyl Terminated Epoxidized Unsaturated Polyolefin

The photocurable composition of the present invention comprises at least one first hydroxyl terminated epoxidized unsaturated polyolefin having an epoxide equivalent weight less than 250 g/eq and at least one second hydroxyl terminated epoxidized unsaturated polyolefin having an epoxide equivalent weight greater than or equal to 250 g/eq. The weight ratio between the first hydroxyl terminated epoxidized unsaturated polyolefin and the second hydroxyl terminated epoxidized unsaturated polyolefin is from 2:5 to 6:5.

The hydroxyl terminated epoxidized unsaturated polyolefin of the present invention refers to a polyolefin with at least one non-aromatic double bond, at least one epoxy group and at least one terminal hydroxyl group per molecule. Preferably, the hydroxyl terminated epoxidized unsaturated polyolefin contains at least two terminal hydroxyl groups per molecule.

In some embodiments of the present invention, the hydroxyl terminated epoxidized unsaturated polyolefin is hydroxyl terminated epoxidized polydiene which is preferably selected from hydroxyl terminated epoxidized polyisoprene, hydroxyl terminated epoxidized polybutadiene, hydroxyl terminated epoxidized copolymer of isoprene and butadiene, hydroxyl terminated epoxidized copolymer of butadiene and ethylene, hydroxyl terminated epoxidized copolymer of butadiene and propylene, and hydroxyl terminated epoxidized terpolymer of butadiene, ethylene and propylene. A specific example of hydroxyl terminated epoxidized unsaturated polyolefin is shown as below:

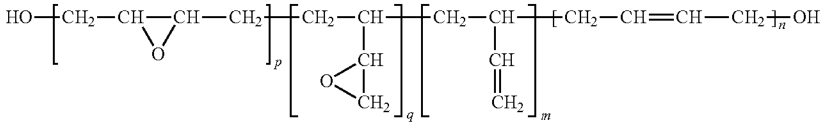

wherein p and q denotes repeat number of epoxidized olefin monomer unit in respect [ ]; p and q are integers greater than or equal to 0, and p and q cannot be both 0 at the same time; m and n denotes repeat number of unsaturated comonomer unit in respect [ ]; m and n are integers greater than or equal to 0, and m and n cannot be both 0 at the same time.

Example of commercially available first hydroxyl terminated epoxidized unsaturated polyolefin is, for example, EPOLEAD PB3600 available from Daicel Corporation.

Examples of commercially available second hydroxyl terminated epoxidized unsaturated polyolefins are, for example, Poly bd 600E and 605E available from Cray Valley.

In some embodiments of the present invention, the first hydroxyl terminated epoxidized unsaturated polyolefin preferably has an epoxide equivalent weight from 100 to 230 g/eq, and more preferably from 150 to 200 g/eq measured according to ISO 3001-1997.

In some embodiments of the present invention, the second hydroxyl terminated epoxidized unsaturated polyolefin preferably has an epoxide equivalent weight from 260 to 600 g/eq, and more preferably from 280 to 380 g/eq measured according to ISO 3001-1997.

In some embodiments of the present invention, the amount of the first hydroxyl terminated epoxidized unsaturated polyolefin is preferably from 5 to 20%, and more preferably from 8 to 14% by weight based on the total weight of the photocurable adhesive composition.

In some embodiments of the present invention, the amount of the second hydroxyl terminated epoxidized unsaturated polyolefin is preferably from 8 to 25%, and more preferably from 10 to 20% by weight based on the total weight of the photocurable adhesive composition.

In some embodiments of the present invention, when the weight ratio between the first hydroxyl terminated epoxidized unsaturated polyolefin and the second hydroxyl terminated epoxidized unsaturated polyolefin is from 4:5 to 1:1, the elongation property of the cured product of the photocurable adhesive composition can be surprisingly even further improved.

Dimer Acid Modified Epoxy Resin

The photocurable adhesive composition of the present invention comprises at least one dimer acid modified epoxy resin. The dimer acid modified epoxy resin of the present invention refers to a resin obtainable by reacting at least one carboxyl group in a dimer acid structure with a polyfunctional epoxy resin. The dimer acid is a dimer of an unsaturated fatty acid, such as an oleic acid, an elaidic acid, a cetoleic acid, a sorbic acid, and a linoleic acid. The epoxy resin is not limited and may be any common epoxy resin known in the art.

Although the epoxy equivalent weight of the dimer acid-modified epoxy resin is not particularly limited, in some embodiments, the dimer acid-modified epoxy resin preferably has an epoxy equivalent weight from 300 to 600 g/eq measured according to ISO 3001-1997.

Examples of commercially available dimer acid-modified epoxy resins are, for example, YD-171 and YD-172 available from Kukdo Chemical Co., Ltd.; jER871 and jER872 available from Mitsubishi Chemical Corporation.

In some embodiments of the present invention, the amount of the dimer acid-modified epoxy resin is preferably from 3 to 25%, and more preferably from 10 to 20% by weight based on the total weight of the photocurable adhesive composition.

Core-Shell Toughening Agent

The photocurable adhesive composition of the present invention comprises at least one core-shell toughening agent to enhance the elongation property of the cured product of the photocurable adhesive composition. The core-shell toughening agent used in the present invention may be any core-shell polymer (or called as core-shell rubber) known in the art. Typically, the core-shell rubber has a core comprised of a polymeric material having rubbery properties, and a shell grafted onto the core or crosslinked to the core. The core of the core-shell rubber may be selected from an acrylic rubber, a silicone rubber and a diene rubber. The shell of the core-shell rubber may be selected from an acrylic polymer, an acrylic copolymer, a styrenic polymer, and a styrenic copolymer. Exemplary of the core shell rubber includes but is not limited to acrylonitrile-butadiene-styrene (ABS), methacrylate-butadiene-styrene (MBS), and methacrylateacrylonitrile-butadiene-styrene (MABS).

Examples of commercially available core-shell toughening agents, for example, are MX-550, MX-551, and MX-553 available from Kaneka Corporation.

In some embodiments of the present invention, the amount of the core-shell toughening agent is from 3 to 15%, and preferably from 6 to 10% by weight based on the total weight of the photocurable adhesive composition.

Polyol Component

The photocurable composition of the present invention comprises at least one polyol component. The term "polyol" of the present invention refers to a compound containing two or more hydroxyl groups. The polyol component of the present invention may be any common polyol which is different from the hydroxyl terminated epoxidized unsaturated polyolefin as pre-described in the present invention. Exemplary of the polyol component includes but is not limited to polyether polyol, polyester polyol, and polymeric polyol.

Examples of commercially available polyol components are, for example, WANOL F-3135 available from Wanhua Chemical; TEP-330N available from No. 3 Petrochemical Plant of Tianjin Petrochemical Company; GEP-330N available from Sinopec Shanghai Gaoqiao Petrochemial Company; and Voranol 220-110N available from Dow.

In some embodiments of the present invention, the amount of the polyol component is from 1 to 9%, and preferably from 3 to 8% by weight based on the total weight of the photocurable adhesive composition.

Cationic Photoinitiator

The photocurable adhesive composition of the present invention comprises at least one cationic photoinitiator to initiator the polymerization of epoxy resin. The cationic photoinitiator, when irradiated, forms an excited state which then breaks down to release a radical cation. This radical cation reacts with hydrogen atom donors, and generates a protonic acid, which initiates the crosslinking reaction.

The most commonly used cationic photoinitiators are organic halonium, iodonium or sulfonium salts. In some embodiments of the present invention, organic lodonium or sulfonium salts are preferable to be incorporated in the photocurable adhesive composition. The anions in theses salts generally possess low nucleophilic character and include but are not limited to SbF6, PF6, AsF6, BF4, B(C6F5)4 or Ga(C6F5)4. The iodonium salt may be selected from, for example, diaryliodonium hexafluorophosphate, diaryliodonium hexafluoroantimonate, diaryliodonium tetrakis(pentafluorophenyl)borate, 4-octyloxyphenyl phenyliodonium hexafluoroantimonate, 4-(2-hydroxytetradecyloxyphenyl)phenyliodonium hexafluoroantimonate, and 4-(1-methylethyl)phenyl 4-methylphenyliodonium tetrakis (pentafluorophenyl)borate. The sulfonium salt may be selected from, for example, 4-thiophenyl phenyl diphenyl sulfonium hexafluoroantimonate, triarylsulfonium hexafluorophosphate and triarylsulfonium hexafluoroantimonate. The cationic photoinitiators can be used alone or in combination.

Examples of commercially available cationic photoinitiators, for example, are Irgacure 290 available from BASF; UVI-6976, 6992 available from Nantong Synasia New Material Co., Ltd; and UVI 6976 available from Dow.

In some embodiments of the present invention, the amount of the cationic photoinitiator is from 0.1 to 10%, and preferably from 3 to 5% by weight based on the total weight of the photocurable adhesive composition.

Optional Additives

The photocurable adhesive composition may further comprise optional additives. The selection of suitable additives for the photocurable adhesive composition of the invention depends on the specific intended use of the photocurable adhesive composition and can be determined in the individual case by those skilled in the art.

Reactive Epoxy Diluent

The photocurable adhesive composition of the present invention may optionally comprise at least one reactive epoxy diluent which may help to adjust the flow characteristics of the adhesive composition. The reactive epoxy diluent of the present invention refers to a compound containing at least one epoxy group in the molecular structure, and is different from the hydroxyl terminated epoxidized unsaturated polyolefin and the dimer acid modified epoxy resin as pre-described in the present invention. Preferably, the reactive epoxy diluent has a viscosity less than 3000 CPS, such as from 10 to 2000 CPS, from 50 to 1000 CPS, and from 100 to 500 CPS at 25 °C. measured according to ASTM D1084-2016. Suitable reactive epoxy diluent includes but is not limited to aliphatic epoxy resin (such as propylene glycol-diglycidyl ether and pentaerythritol-polyglycidyl ether), alicyclic epoxy resin (such as 3.4-epoxycyclohexylmethyl-3.4-epoxycyclohexanecarboxylate and bis (3.4-epoxycyclohexylmethyl) adipate), and heterocyclic epoxy resin (such as triglycidyl isocyanurate).

Although the epoxy equivalent weight of the reactive epoxy diluent is not particularly limited, in some embodiments, the reactive epoxy diluent preferably has an epoxy equivalent weight less than 250 g/eq, such as 50 g/eq, 100 g/eq, and 200 g/eq measured according to ISO 3001-1997.

Examples of commercially available reactive epoxy diluents, for example, are Epodil 749, 757 available from Air Products; Araldite CY179, 184, 192, available from Ciba Specialty Chemicals; Aron Oxetane OXT 101 available from Toagosei Co., Ltd.; and Syna-Epoxy S21, 27, 28 available from Nantong Synasia New Material Co., Ltd.

In some embodiments of the present invention, the amount of the reactive epoxy diluent is from 0 to 60%, and preferably from 15 to 50% by weight based on the total weight of the photocurable adhesive composition.

Coupling Agent

The photocurable adhesive composition of the present invention may optionally comprise at least one coupling agent. The coupling agent of the present invention may be any common coupling agent known in the art. The coupling agent may be selected from a silane coupling agent, a titanate coupling agent, or the like. The coupling agent of the present invention can be used alone or in combination. The silane coupling agent can be exemplified by epoxy-containing alkoxysilane, such as 3-glycidoxypropyl trimethoxysilane, 3-glycidoxypropyl methyldiethoxysilane, and 3-glycidoxypropyl triethoxysilane; amino-containing alkoxysilane, such as gamma-aminopropyl trimethoxysilane, gamma-aminopropyl triethoxysilane, gamma-aminopropyl triisopropoxysilane, and gamma-aminopropylmethyl dimethoxysilane; and mercapto-containing alkoxysilane, such as 3-mercaptopropyl trimethoxysilane. The titanate coupling agent can be exemplified by i-propoxytitanium tri(iisostearate).

Examples of commercially available coupling agents are, for example, KMB403, KMB 603 available from Shin-Etsu Chemical; SILQUEST A187, SILQUEST A1120 available from Momentive; KH570 available from Dowcorning; and GENIOSIL GF9 available from Wacker Chemie AG.

In some embodiments of the present invention, the amount of the coupling agent is preferably from 0 to 5%, and more preferably from 1 to 3% by weight based on the total weight of the photocurable adhesive composition.

Colorant

The photocurable adhesive composition of the present invention may optionally comprise at least one colorant. Examples of the colorants include but are not limited to inorganic or organic colorants, such as ferric oxide, brick dust titanium oxide, bromothymol blue, brilliant blue, phenothalin and the like.

Examples of commercially available colorants are, for example, Stan-Tone 25EPX01 Red and Solvent Red 24 available from Dintex Dyechem.

In some embodiments of the present invention, the amount of the colorant is preferably from 0 to 1%, and more preferably from 0.1 to 0.2% by weight based on the total weight of the photocurable adhesive composition.

Other optional additives that may be used in the photocurable adhesive composition of the present invention, include, but are not limited to biocides, fillers, and the mixtures thereof.

In a preferred embodiment, the photocurable adhesive composition comprises:

(a) from 8% to 14% by weight of at least one first hydroxyl terminated epoxidized unsaturated polyolefin having an epoxide equivalent weight less than 250 g/eq;

(b) from 10% to 20% by weight of at least one second hydroxyl terminated epoxidized unsaturated polyolefin having an epoxide equivalent weight greater than or equal to 250 g/eq;
(c) from 10% to 20% by weight of at least one dimmer acid modified epoxy resin;
(d) from 6 to 10% by weight of at least one core-shell toughening agent;
(e) from 3% to 8% by weight of at least one polyol component;
(f) from 3% to 5% by weight of at least one cationic photoinitiator;
(g) from 15% to 50% by weight of at least one reactive epoxy diluent;
(h) from 1% to 3% by weight of at least one coupling agent; and
(i) from 0% to 0.2% by weight of at least one colorant;

wherein the weight percentages of all components add up to 100% by weight; and the weight ratio between the first hydroxyl terminated epoxidized unsaturated polyolefin and the second hydroxyl terminated epoxidized unsaturated polyolefin is from 2:5 to 6:5.

A person skilled in the art will be able to make appropriate choices among the varies components based on the description, representative examples and guidelines of the present invention to prepare a composition to achieve desired effects.

The photocurable adhesive composition of the present invention may be prepared by homogeneously mixing all components together, and preferably by steps of:

a) mixing all components together except for the photoinitator and colorant to form a pre-mixture;
b) adding colorant into the pre-mixture with continuous stirring; and
c) adding photoinitiator into the pre-mixture and mixing all components under yellow light and vacuum.

The photocurable adhesive composition of the present invention may be applied to a substrate via a scarper, a sprayer, a dispenser or an extruder, and allowed to be cured with UV light. Suitable substrate includes but is not limited to metals (such as steels, stainless steels, carbon steels, iron, copper, aluminum, zinc, etc., including alloys thereof), carbon fibers, glass fibers, glass, woods, plastics, woven materials, non-woven materials, and mixtures thereof.

In some embodiments of the present invention, the photocurable adhesive composition is preferably cured by LED 365 with an intensity of 2000 to 3000 $mj/cm^2$ (such as 2200, 2500, and 2700 $mj/cm^2$) and irradiated for 10 to 30 seconds (such as 15 seconds and 20 seconds).

The cured product of the photocurable adhesive composition has excellent elongation property and is particularly useful to protect curved glass or round cornered glass during the glass sliming process. In addition, the glass protected by the cured product of the photocurable adhesive composition can be thinned to about 0.2 mm due to the outstanding acid resistance property of the cured product of the photocurable adhesive composition.

In some embodiments of the present invention, the cured product of the photocurable adhesive composition preferable has an elongation at break greater or equal to 10%, more preferably greater than or equal to 15%, and even more preferably greater or equal to 20% measured according to ASTM D638.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Example 1-16

The following materials were used in the examples.

YD-171 (Dimer acid modified epoxy resin available from Kukdo Chemical Co., Ltd.); MX553 (30% concentration of 100 nm PBd core-shell rubber (CSR) particles in a low viscosity, low chlorine cyclo-aliphatic epoxy resin available from Kaneka Corporation); EPOLEAD PB3600 (Hydroxyl terminated epoxidized unsaturated polyolefin having an epoxide equivalent weight of 193 g/eq available from Daicel Corporation);

Poly bd 605E (Hydroxyl terminated epoxidized unsaturated polyolefin having an epoxide equivalent weight of 300 g/eq available from Cray Valley);

Stan-Tone 25EPX01 Red (colorant available from PolyOne); Voranol 220-110N (Polyol available from Dow);

Syna epoxy 28 (Bis(3,4-epoxycyclohexylmethyl) adipate having a viscosity of 500-650 CPS at 25 °C. available from Nantong Synasia New Material Co., Ltd.);

Aron Oxetane OXT 101 (3-Ethyl-3-hydroxymethyloxetane having a viscosity of 17-22 CPS at 25 °C. available from Toagosei Co., Ltd.);

SILQUEST A187 (epoxy functional silane available from Momentive);

UVI 6976 (Mixture of triarylsulfonium hexafluoroantimonate salts in propylene carbonate available from Dow) having the structure of:

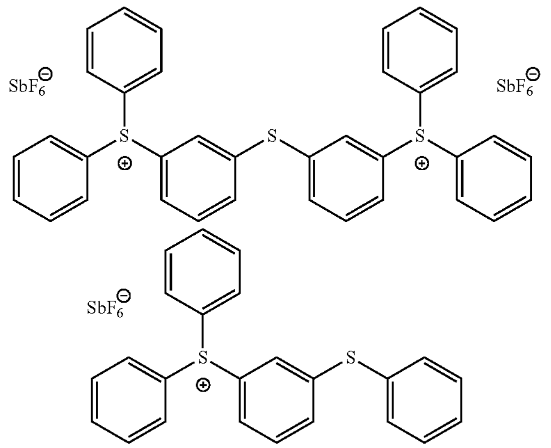

The photocurable adhesive compositions were prepared as Examples (Ex.) using the components and respect weight percentages according to Table 1 by steps of:

a) mixing dimer acid modified epoxy resin (YD-171), core-shell toughening agent (MX553), hydroxyl terminated epoxidized unsaturated polyolefins (EPOLEAD PB3600 and/or Poly bd 605E) polyol component (Voranol 220-110N), reactive epoxy diluent (Syna epoxy 28 and Aron Oxetane OXT 101), and coupling agent (SILQUEST A187) at a speed of 1000 r/min for 30 s and then at a speed of 2000 r/min for 60 s to form a pre-mixture.

b) adding colorant (Stan-Tone 25EPX01 Red) into the pre-mixture and mixing at a speed of 1000 r/min for 30 s and then at a speed of 2000 r/min for 60 s.

c) Under the yellow light and vacuum (vacuum degree was controlled to be about −0.09 Mpa), adding photo initiator (UVI 6976) into the pre-mixture and mixing all components at a speed of 1000 r/min for 30 s and then at a speed of 2000 r/min for 60 s.

The photocurable adhesive samples were subjected to various tests, and the results were reported in Table 2 to 3.

TABLE 1a

| Photocurable adhesive composition | | | | | | | | |
|---|---|---|---|---|---|---|---|---|
| | Weight (%) | | | | | | | |
| Component | Ex. 1 | Ex.2 | Ex.3 | Ex.4 | Ex.5 | Ex.6 | Ex.7 | Ex.8 |
| YD-171 | 10 | 10 | 10 | 5 | 15 | 20 | 10 | 10 |
| MX553 | 27 | 27 | 27 | 32 | 22 | 17 | 29 | 24 |
| EPOLEAD PB3600 | 8 | 10 | 12 | 10 | 10 | 10 | 10 | 10 |
| Poly bd 605E | 17 | 15 | 13 | 15 | 15 | 15 | 15 | 15 |
| Stan-Tone 25EPX01 Red | 0.2 | 0.2 | 0.2 | 0.2 | 0.2 | 0.2 | 0.2 | 0.2 |
| Voranol 220-110N | 5 | 5 | 5 | 5 | 5 | 5 | 3 | 8 |
| Syna epoxy 28 | 16.8 | 16.8 | 16.8 | 16.8 | 16.8 | 16.8 | 16.8 | 16.8 |
| Aron Oxetane OXT 101 | 10 | 10 | 10 | 10 | 10 | 10 | 10 | 10 |
| SILQUEST A187 | 1 | 1 | 1 | 1 | 1 | 1 | 1 | 1 |
| UVI 6976 | 5 | 5 | 5 | 5 | 5 | 5 | 5 | 5 |

TABLE 1b

| Photocurable adhesive composition | | | | | | | | |
|---|---|---|---|---|---|---|---|---|
| | Weight (%) | | | | | | | |
| Component | Ex. 9 | Ex. 10 | Ex. 11 | Ex. 12 | Ex. 13 | Ex. 14 | Ex. 15 | Ex. 16 |
| YD-171 | 10 | 10 | 10 | 10 | 10 | 0 | 10 | 10 |
| MX553 | 27 | 27 | 27 | 27 | 27 | 37 | 32 | 22 |
| EPOLEAD PB3600 | 0 | 25 | 5 | 20 | 15 | 10 | 10 | 10 |
| Poly bd 605E | 25 | 0 | 20 | 5 | 10 | 15 | 15 | 15 |
| Stan-Tone 25EPX01 Red | 0.2 | 0.2 | 0.2 | 0.2 | 0.2 | 0.2 | 0.2 | 0.2 |
| Voranol 220-110N | 5 | 5 | 5 | 5 | 5 | 5 | 0 | 10 |
| Syna epoxy 28 | 16.8 | 16.8 | 16.8 | 16.8 | 16.8 | 16.8 | 16.8 | 16.8 |
| Aron Oxetane OXT 101 | 10 | 10 | 10 | 10 | 10 | 10 | 10 | 10 |
| SILQUEST A187 | 1 | 1 | 1 | 1 | 1 | 1 | 1 | 1 |
| UVI 6976 | 5 | 5 | 5 | 5 | 5 | 5 | 5 | 5 |

Test Methods

Acid Resistance Property

The photocurable adhesive sample was coated onto a glass substrate to form a wet film with a thickness about 200 μm, and the wet film coated glass was exposed to Hg-UV light (786 mj/cm$^2$) for 20 seconds for curing.

The film coated glass substrate was dipped into a sulphuric acid solution (35 wt %) for 24 hours under an environment of 23 °C. and 50% humidity.

The acid resistance property of the film was evaluated as below:

If the film had no corrosion, no bubble, no change of color and easy to be peeled off continuously from the glass without breaking, the acid resistance property of the cured photocurable adhesive sample was ranked as “Pass”; and If the film had corrosion, or bubble, or changed color, or was broken during the peeling process, the acid resistance property of the cured photocurable adhesive sample was ranked as “Fail”.

Elongation Property

The photocurable adhesive sample was cured and tested by steps of:

a) placing a mold (size: 200×200×1 mm) on a glass substrate which was laid horizontally;

b) filling the mold with the photocurable adhesive sample to form a wet film with a thickness of 1 mm;

c) placing a second glass substrate over the mold enclosing the wet film in between the two glass substrates;

d) irradiating the enclosed wet film with Hg-UV light (786 mj/cm$^2$) for 20 s;

e) flipping the enclosed wet film and irradiating the enclosed wet film with Hg-UV light (786 mj/cm$^2$) for another 20 s;

f) flipping the enclosed wet film again and irradiating the enclosed wet film with Hg-UV light (786 mj/cm$^2$) for 20 s to form a dry film;

g) preparing a sample film from the dry film according to ASTM D638;

h) storing the sample film for 24 hours before testing under the environment of 23 °C. and 50% humidity; and i) measuring the elongation at break of the sample film according to ASTM D638.

Test Results

TABLE 2a

| Acid Resistance Property | | | | | | | |
|---|---|---|---|---|---|---|---|
| Ex. 1 | Ex. 2 | Ex. 3 | Ex. 4 | Ex. 5 | Ex. 6 | Ex. 7 | Ex. 8 |
| Pass | Pass | Pass | Pass | Pass | Pass | Pass | Pass |

TABLE 2b

| Acid Resistance Property | | | | | | | |
|---|---|---|---|---|---|---|---|
| Ex. 9 | Ex. 10 | Ex. 11 | Ex. 12 | Ex. 13 | Ex. 14 | Ex. 15 | Ex. 16 |
| Fail | Pass | Pass | Pass | Pass | Pass | Pass | Fail |

The acid resistance property of the cured photocurable adhesive samples is reported in Table 2a and 2b. The cured photocurable adhesive sample had poor acid resistance property when the first hydroxyl terminated epoxidized unsaturated polyolefin (EPOLEAD PB3600) was missing from the photocurable adhesive composition sample or when too much of the polyol component (Voranol 220-110ON) was added in the photocurable adhesive composition sample.

TABLE 3a

| Elongation Property | | | | | | | | |
|---|---|---|---|---|---|---|---|---|
| Elongation at break | Ex. 1 | Ex. 2 | Ex. 3 | Ex. 4 | Ex. 5 | Ex. 6 | Ex. 7 | Ex. 8 |
| Percentage (%) | 14.7 | 13.1 | 25.2 | 12.2 | 15.8 | 25.7 | 12.3 | 24.6 |

TABLE 3b

| Elongation Property | | | | | | | | |
|---|---|---|---|---|---|---|---|---|
| Elongation at break | Ex. 9 | Ex. 10 | Ex. 11 | Ex. 12 | Ex. 13 | Ex. 14 | Ex. 15 | Ex. 16 |
| Percentage (%) | 23.6 | 5.2 | 9.8 | 3.6 | 6.0 | 8.2 | 5.6 | 15.3 |

The elongation property of the cured photocurable adhesive samples is reported in Table 3a and 3b. The cured photocurable adhesive sample had poor elongation property when the weight ratio between the first hydroxyl terminated epoxidized unsaturated polyolefin and the second hydroxyl terminated epoxidized unsaturated polyolefin was not in the range of 2:5 to 6:5, or when the polyol component or the dimer acid modified epoxy resin (YD-171) was missing from the photocurable adhesive composition sample.

What is claimed is:

1. A photocurable adhesive composition comprising:

a) at least one first hydroxyl terminated epoxidized unsaturated polyolefin having an epoxide equivalent weight less than 250 g/eq;

b) at least one second hydroxyl terminated epoxidized unsaturated polyolefin having an epoxide equivalent weight greater than or equal to 250 g/eq;

c) at least one dimer acid modified epoxy resin;

d) at least one core-shell toughening agent;

e) at least one polyol component; and f) at least one cationic photoinitiator;

wherein the weight ratio between the first hydroxyl terminated epoxidized unsaturated polyolefin and the second hydroxyl terminated epoxidized unsaturated polyolefin is from 2:5 to 6:5;

the amount of the core-shell toughening agent is from 3% to 15% by weight based on the total weight of the adhesive composition; and the amount of the polyol component is from 1 to 9% by weight based on the total weight of the adhesive composition.

2. The photocurable adhesive composition according to claim 1, wherein the first hydroxyl terminated epoxidized unsaturated polyolefin has two terminal hydroxyl groups per molecule.

3. The photocurable adhesive composition according to claim 1, wherein second hydroxyl terminated epoxidized unsaturated polyolefin has two terminal hydroxyl groups per molecule.

4. The photocurable adhesive composition according to claim 1, wherein the first hydroxyl terminated epoxidized unsaturated polyolefin has an epoxide equivalent weight from 100 to 230 g/eq.

5. The photocurable adhesive composition according to claim 1, wherein the second hydroxyl terminated epoxidized unsaturated polyolefin has an epoxide equivalent weight from 260 to 600 g/eq.

6. The photocurable adhesive composition according to claim 1, wherein both of the first and second hydroxyl terminated epoxidized unsaturated polyolefins are hydroxyl terminated epoxidized polydiene.

7. The photocurable adhesive composition according to claim 1, wherein the amount of the first hydroxyl terminated epoxidized unsaturated polyolefin is from 5 to 20% by weight based on the total weight of the adhesive composition.

8. The photocurable adhesive composition according to claim 1, wherein the amount of the second hydroxyl terminated epoxidized unsaturated polyolefin is from 8 to 25% by weight based on the total weight of the adhesive composition.

9. The photocurable adhesive composition according to claim 1, wherein the amount of the polyol component is from 3 to 8% by weight based on the total weight of the adhesive composition.

10. The photocurable adhesive composition according to claim 1, wherein the weight ratio between the first hydroxyl terminated epoxidized unsaturated polyolefin and the second hydroxyl terminated epoxidized unsaturated polyolefin is from 4:5 to 1:1.

11. The photocurable adhesive composition according to claim 1, wherein the cationic photoinitiator is selected from organic halonium salt, organic iodonium salt, organic sulfonium salt or any combination thereof.

12. The photocurable adhesive composition according to claim 1, comprising:

(a) from 8% to 14% by weight of at least one first hydroxyl terminated epoxidized unsaturated polyolefin having an epoxide equivalent weight less than 250 g/eq;

(b) from 10% to 20% by weight of at least one second hydroxyl terminated epoxidized unsaturated polyolefin having an epoxide equivalent weight greater than or equal to 250 g/eq;

(c) from 10% to 20% by weight of at least one dimer acid modified epoxy resin;

(d) from 6 to 10% by weight of at least one core-shell toughening agent;

(e) from 3 to 8% by weight of at least one polyol component;

(f) from 3 to 5% by weight of at least one cationic photoinitiator;

(g) from 15 to 50% by weight of at least one reactive epoxy diluent;

(h) from 1 to 3% by weight of at least one coupling agent; and (i) from 0 to 0.2% by weight of at least one colorant;

wherein the weight percentages of all components add up to 100% by weight; and the weight ratio between the first hydroxyl terminated epoxidized unsaturated polyolefin and the second hydroxyl terminated epoxidized unsaturated polyolefin is from 2:5 to 6:5.

13. A method to produce the photocurable adhesive composition according to claim 1 comprising steps of:

a) mixing components (a)-(d) together to form a pre-mixture;

b) adding colorant (f) into the pre-mixture with continuous stirring; and c) adding cationic photoinitiator (e) into the pre-mixture and mixing all components under yellow light and vacuum.

14. A cured product of the photocurable adhesive composition according to claim 1.

15. An article coated with or bonded by the cured product of the photocurable adhesive composition according to claim 14.

* * * * *